July 15, 1924.

S. W. HYATT 1,501,411

SPOTLIGHT

Filed Jan. 9, 1924

Inventor
Samuel W. Hyatt
Watson E. Coleman
Atty

July 15, 1924.
S. W. HYATT
SPOTLIGHT
Filed Jan. 9, 1924
1,501,411
2 Sheets-Sheet 2
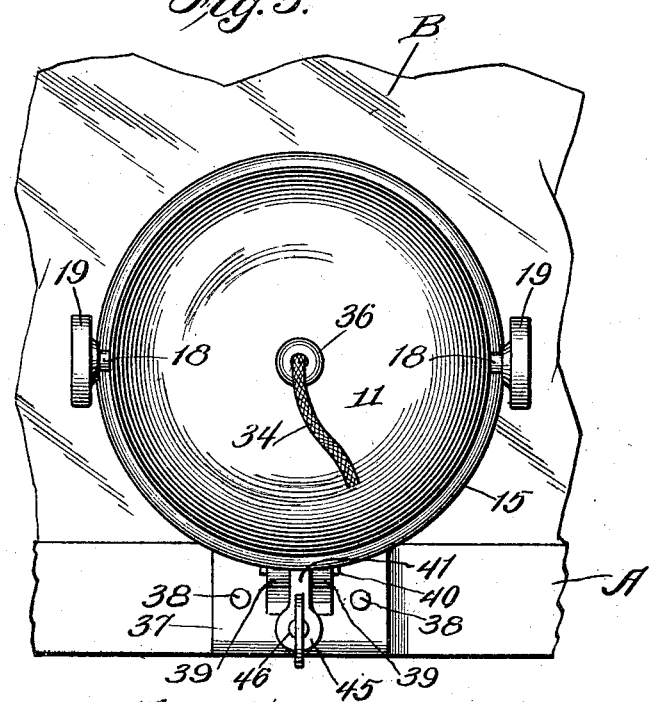
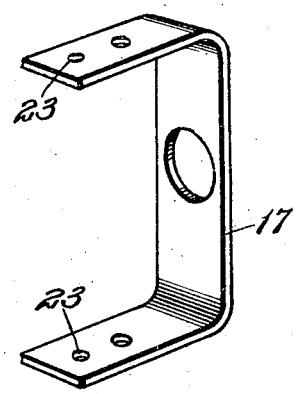
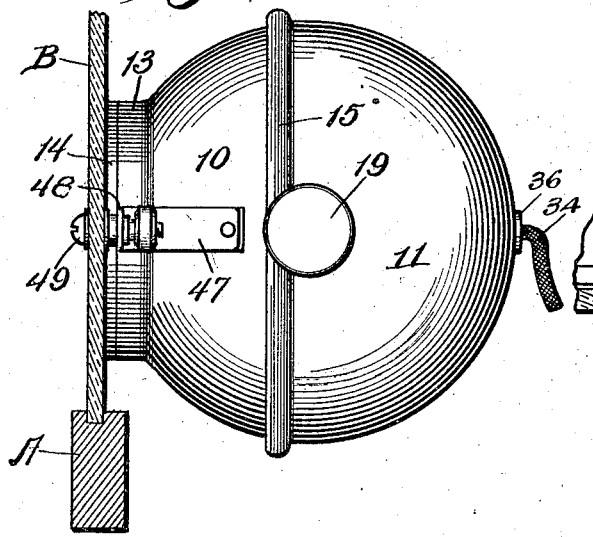
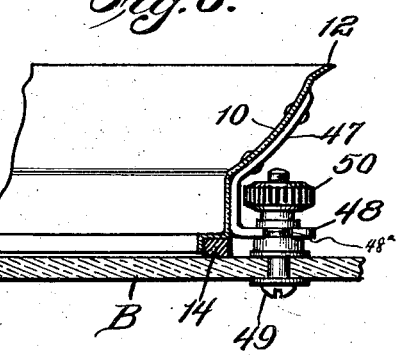
Inventor
Samuel W. Hyatt
Watson E. Coleman
Atty Patented July 15, 1924.

1,501,411

UNITED STATES PATENT OFFICE.

SAMUEL W. HYATT, OF COLUMBUS, OHIO.

SPOTLIGHT.

Application filed January 9, 1924. Serial No. 685,268.

*To all whom it may concern:*

Be it known that I, SAMUEL W. HYATT, a citizen of the United States, residing at Columbus, in the county of Franklin and State of Ohio, have invented certain new and useful Improvements in Spotlights, of which the following is a specification, reference being had to the accompanying drawings.

This invention relates to accessories for motor vehicles, particularly to spot lights, and has for its object the provision of a novel device of this character designed to be mounted upon the inside of the wind shield in an optional mounting, the construction being such that adjustment may be made with the utmost ease for throwing the light wherever desired.

An important feature is the provision of novel means for effecting mounting of the device against the wind shield and in a manner which will avoid rattling.

Another object is the provision of a device of this character which is entirely enclosed, the shield or casing being, however, easily capable of disassembling for the purpose of making adjustments, bulb replacements, or repairs to any of the parts.

The invention has for further objects the provisions of means for holding the adjustable elements in fixed position so that any desired adjustment may be maintained without danger of accidental displacement.

A still further object is the provision of a spot light structure of this character which will be simple and inexpensive in manufacture, easy to apply, efficient and durable in service, positive in action, and a general improvement in the art.

With the above and other objects and advantages in view, the invention consists in the combination, construction and arrangement of parts to be hereinafter more fully described and claimed and illustrated in the accompanying drawings in which:

Figure 3 is a view of the device looking toward the wind shield from the inside of the car.

Figure 4 is a detail perspective view of the reflector carrying yoke.

Figure 5 is a view similar to Figure 2 but showing a modified manner of attachment to the wind shield.

Figure 6 is a detail sectional view through the modified form.

Figure 1:
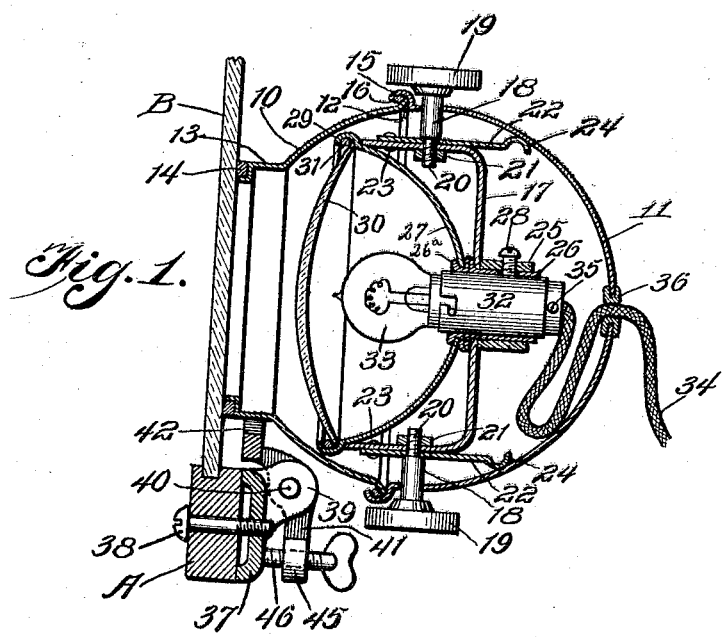
Figure 1 is a longitudinal section through the device showing it applied to a wind shield, the latter being also in section.

Referring more particularly to the drawings, the letter A designates a wind shield frame carrying the usual glass pane B against the inner side of which I mount my spot light. In carrying out the invention I provide a spot light structure which comprises a shell formed of two sections 10 and 11 rotatably and detachably connected by means to be described and formed preferably of suitable sheet-metal enameled or otherwise treated to have a pleasing appearance. The section 10 is partially spherical in shape and terminates at one edge in a bead 12 and at its other edge in a cylindrical hood 13 which is disposed toward or against the wind shield glass B. At its end, this cylindrical portion carries a rubber or other gasket 14 which fits against the glass for preventing rattling when the device is in place. The section 11 is substantially semi-spherical and terminates at its open edge in a bead 15 receiving and extending outwardly and beyond the bead 12. The two sections 10 and 11 are held together by means of a split spring ring 16 located within the bead 15 and overlying the bead 12. By this particular connection it is obvious that the section 11 may be rotated with respect to the section 10.

Located within the shell or casing is a U-shaped yoke 17 held in place by a pair of diametrically opposite stems 18 which pass through the shell section 11 and which carry operating knobs 19 located exteriorly of the shell. The inner ends of these stems, where they pass through the yoke, are reduced and threaded, as shown at 20, and carry clamping nuts 21 which effect securing of the stems to the yoke. It should also be stated that elongated leaf springs 22 are provided through which the reduced extensions 20 of the stems pass, and these springs are additionally riveted, at 23, to the arms of the yoke so as to be rigid with respect thereto. The rear or free ends of these springs are bent, as shown at 24, and bear against the inner periphery of the shell section 11 for maintaining the yoke in any adjusted position within the shell, for a purpose to be described.

Abutting the center of the bight portion of the yoke 17 is a sleeve 25. Carried by the center of the rear side of the reflector 27 is a second sleeve 26, the forward end portion 26ª of which is beaded to the reflector so that it is secured against longitudinal movement with relation thereto. Threaded through the sleeve 25 is a securing element 28 which passes through an opening formed in the sleeve 26 to engage with a socket 32. The forward or open edge of the reflector is formed with an overhanging bead 29 which constitutes retaining means for a lens 30 held in place by a split spring ring 31 overlying the lens at its edge and seating within the bead 29.

The socket 32 is preferably of the bayonet slotted type and holding an incandescent bulb 33 to which current is supplied through conducting wires 34 which are anchored within the socket by a set screw 35 and which pass through an insulating grommet 36 at the center of the rear side of the shell section 11. These wires lead to the storage battery or other source of current supply and also to a control switch which is, however, not illustrated for the reason that it forms no part of the present invention.

The above described lamp structure is common to both forms of the invention, the difference between the two forms residing only in the manner of mounting on the wind shield.

Figure 2:
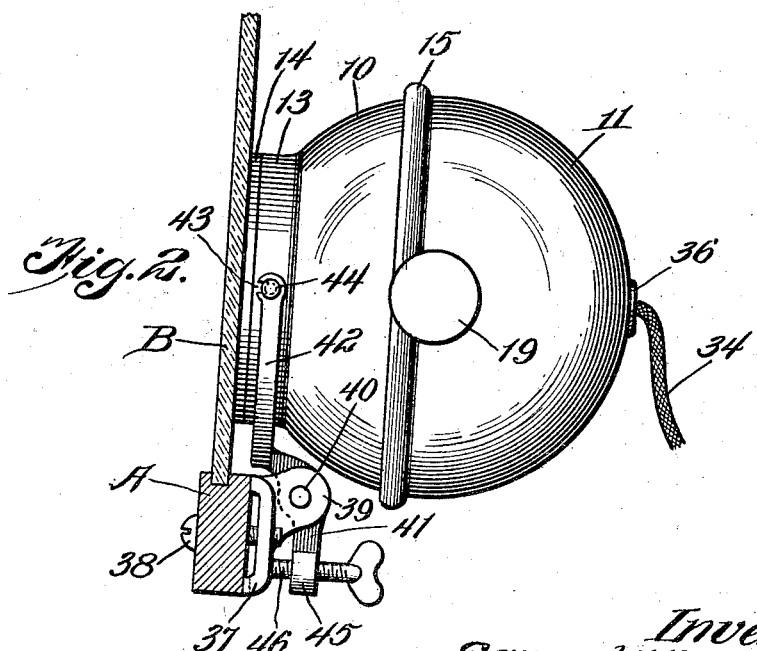
Figure 2 is a side elevation with the rotatable shell section turned through an arc of 90° with respect to the position shown in Figure 1, the wind shield being in section in this view.

In Figures 1 to 3, I have shown holding means for the lamp comprising a clamping member 37 disposed against the inner face of the wind shield frame and held thereto by a pair of screws 38 or the like. On the clamp 37 are ears 39 between which is pivoted, at 40, an arm 41 formed with or carrying a yoke 42 which is substantially semi-circular and which embraces the cylindrical portion 13 of the shell section 10, the ends of the arms of the yoke being formed with slots 43 engaging upon headed studs 44 projecting from opposite sides of the cylindrical portion 13. The lower end of the arm 41 extends to a point substantially even with the lower edge of clamp 37 and is formed with a bearing 45 having a threaded hole receiving a clamping screw 46 which bears against the clamp 37.

From an inspection of the illustration of the above mounting, it will be apparent that when the screw 46 is tightened, the entire lamp structure is held firmly against the inside of the glass pane B, rattling being prevented by the gasket or rubber ring 14. When it is desired to remove the lamp structure for any purpose, it is merely necessary to loosen the screw 46 so that the yoke 42 may be moved to disengage the slots 43 therein from the headed studs 44, which will release the lamp.

For focusing the light, it is merely necessary to loosen the set screw 28 so that the sleeve 26 may be slid to the desired position within the sleeve 25, after which the set screw 28 is tightened to maintain the desired position.

If it should be necessary to replace a burnt out bulb or do anything which requires access to the interior of the device, it is a simple matter to remove the spring ring 16 from the bead 15, whereupon the section 11 may be removed from the section 10 of the shell without in any way interfering with the mounting upon the wind shield. Access is had to the bulb itself by removing the spring ring 31 so that the lens 30 may be taken out.

In Figures 5 and 6 I have shown a modified form of mounting in which the device is secured directly to the glass instead of to the frame of the wind shield. In this case I have illustrated bracket arms 47 secured upon opposite sides of the shell section 10 and having outwardly extending ears 48 having slots 48ª through which pass bolts 49 extending through suitable holes in the glass pane B and equipped with clamping nuts 50.

In the operation of the device, it is apparent that by grasping either knob 19 and turning it, the reflector 27 carrying the bulb may be tilted. By pulling upon either knob 19, the shell section 11 may be rotated with respect to the section 10 and in this way the light may be thrown in any desired direction.

From the foregoing description and a study of the drawings, it will be apparent that I have thus provided a neat, attractive, simply manufactured, and easily applied spot light which possess many features of advantage and superiority over ordinary varieties, particularly in ease of control or adjustment, together with accessibility in case of necessity.

While I have shown and described the preferred embodiments of my invention, it is of course to be understood that I reserve the right to make such changes in the form, construction and arrangement of parts as will not depart from the spirit of the invention or the scope of the subjoined claims.

I claim:

1. In a spotlight device, a shell member, means for mounting the same upon a wind shield, a second shell mounted upon the rear edge of the first named shell for rotation about the axis thereof, a yoke pivoted within the second named shell and having operating handles projecting laterally beyond the second named shell member, a reflector carried by the yoke, and illuminating means carried by the yoke within the reflector.

2. In a spotlight device, a shell member, means for mounting the same stationarily, a second shell member revolubly mounted upon the rear edge of said first named shell member for rotation only about the axis of both, a support located within both shell members, trunnions carried by opposite sides of said support and journally passing through the second named shell member and terminating in handle members, illuminating means, and a reflector carried by said support.

3. In a spotlight device, a shell member, means for mounting the same stationarily, a second shell member revolubly mounted upon the rear edge of said first named shell member for rotation only about the axis of both, a support located within both shell members, trunnions carried by opposite sides of said support and journally passing through the second named shell member and terminating in handle members, illuminating means, a reflector carried by said support, and spring means carried by the support frictionally engaging the inside of the second named shell member for opposing too free movement thereof.

4. In a spotlight device, a shell member adapted to be stationarily mounted, a relatively movable shell member disposed against the rear end thereof, interengaging beads on the meeting edges of the shell members providing bearing means whereby the second named shell member is rotatable upon the first named shell member about the axis thereof, a support located within the enclosure defined by both shell members, a reflector carried by said support, illuminating means carried by the support, and trunnions on the support journaled through diametrically opposite points on the second named shell member and terminating in handles by means of which the support may be tilted and the second named shell member rotated.

5. In a spot light structure, a shell including detachably revolubly connected sections having a common axis, means for securing one section with respect to a wind shield, a yoke pivoted within the shell, a reflector carried by the yoke and carrying an incandescent bulb, and handle means connected with the yoke for tilting the reflector and rotating one section.

6. In a spot light structure, a shell including a pair of sections arranged in end to end relation with their confronting edges formed with beads, a spring ring within one bead engaging the other for holding the sections assembled, means for securing one section with respect to a wind shield, a yoke pivoted within the shell, a reflector carried by the yoke and carrying an incandescent bulb, and handle means connected with the yoke for tilting the reflector, said handle means serving to effect rotation of one section of the shell with respect to the other.

7. In a spot light structure, a shell including detachably connected sections, means for securing one section with respect to a wind shield, a yoke pivoted within the shell, a reflector carried by the yoke and carrying an incandescent bulb, handle means connected with the yoke for tilting the reflector, said handle means serving to effect rotation of one section of the shell with respect to the other, and a leaf-spring secured to the yoke and having its free end conformingly and frictionally engaging the interior of the shell for maintaining an adjusted position.

8. In a spot light structure, a shell including detachably connected sections, means for securing one section with respect to a wind shield, a yoke pivoted within the shell, a reflector carried by the yoke and carrying an incandescent bulb, handle means connected with the yoke for tilting the reflector, said handle means serving to effect rotation of one section of the shell with respect to the other, a sleeve abutting the yoke, the reflector carrying a sleeve extending through the yoke into the first named sleeve, a socket with the last named sleeve, and means carried by the first named sleeve and extending through the last named sleeve for securing the socket in adjusted positions.

9. In a device of the character described, a lamp shell containing illuminating means and having an open edge disposed against the inner side of a wind shield, means for holding said open edge against the wind shield, comprising a plate member disposed against the wind shield frame and provided with ears, a bracket arm pivoted between the ears and terminating in a yoke having the ends of its arms formed with slots, headed studs projecting from the shell and engaged within said slots, and a clamping screw threaded through said bracket arm and engaging said plate.

In testimony whereof I hereunto affix my signature.

SAMUEL W. HYATT.